(12) United States Patent
Van Luchene

(10) Patent No.: US 8,267,794 B2
(45) Date of Patent: Sep. 18, 2012

(54) PROFIT SHARING IN VIDEO GAME ENVIRONMENTS

(75) Inventor: Andrew Stephen Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 297 days.

(21) Appl. No.: 12/861,909

(22) Filed: Aug. 24, 2010

(65) Prior Publication Data

US 2010/0317429 A1     Dec. 16, 2010

Related U.S. Application Data

(63) Continuation of application No. 11/567,122, filed on Dec. 5, 2006, now Pat. No. 7,780,532, which is a continuation-in-part of application No. 11/380,489, filed on Apr. 27, 2006, now abandoned, and a continuation-in-part of application No. 12/861,909, and a continuation-in-part of application No. 11/279,991, filed on Apr. 17, 2006, now Pat. No. 7,677,973, and a continuation-in-part of application No. 12/861,909, which is a continuation-in-part of application No. 11/355,232, filed on Feb. 14, 2006, now abandoned.

(60) Provisional application No. 60/727,121, filed on Oct. 14, 2005.

(51) Int. Cl.
*A63F 13/00* (2006.01)

(52) U.S. Cl. .................. 463/42; 463/1; 463/11; 463/25

(58) Field of Classification Search ............... 463/1, 11, 463/25, 42
See application file for complete search history.

(56) References Cited

U.S. PATENT DOCUMENTS

| | | | | |
|---|---|---|---|---|
| 6,119,229 A | * | 9/2000 | Martinez et al. | 726/28 |
| 6,634,950 B2 | * | 10/2003 | Yoshimi et al. | 463/42 |
| 6,709,330 B1 | * | 3/2004 | Klein et al. | 463/9 |
| 7,040,982 B1 | * | 5/2006 | Jarvis et al. | 463/9 |
| 2003/0177187 A1 | * | 9/2003 | Levine et al. | 709/205 |

* cited by examiner

*Primary Examiner* — James S McClellan

(57) ABSTRACT

Video game methods and systems allow players to acquire ownership of video game environments. Methods and systems additionally include methods for buying and selling ownership or fractions of ownership in a particular game environment.

19 Claims, 3 Drawing Sheets

PROFIT SHARING IN VIDEO GAME ENVIRONMENTS

The following application is a continuation of U.S. patent application Ser. No. 11/567,122, filed Dec. 5, 2006 now U.S. Pat. No. 7,780,532, which is a continuation-in part of U.S. patent application Ser. No. 11/380,489 filed Apr. 27, 2006 now abandoned. The present application is also a continuation in part of U.S. patent application Ser. No. 11/279,991, filed Apr. 17, 2006 now U.S. Pat. No. 7,677,973 which claims priority to U.S. Provisional Application Ser. No. 60/727,121 "Methods, Processes, and System to Enhance a Player Experience of a Video Game" filed Oct. 14, 2005. The present application is also a continuation-in-part of U.S. patent application Ser. No. 11/355,232, filed Feb. 14, 2006 now abandoned. Each of the above applications is hereby incorporated by reference in their entirety for all purposes.

BACKGROUND

Video games which are accessible to multiple players via a server or peer to peer network are well known. For example, hundreds of thousands of players access games known as massive multi-player online games (MMOGs) and massive multi-player online role playing games (MMORPGs). Players of these games customarily access a game repeatedly (for durations typically ranging from a few minutes to several days) over a given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games including, but not necessarily limited to MMOGs and MMORPGs.

DETAILED DESCRIPTION

Definitions

Figure 1:
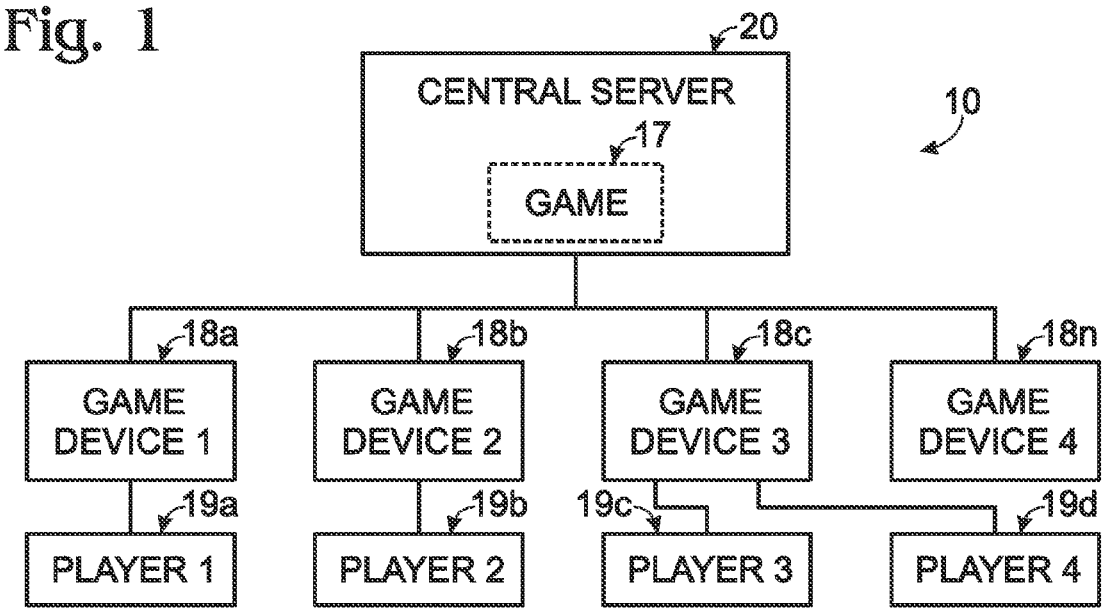
FIG. 1 is a block diagram depicting a network according to an embodiment of the present disclosure.

Unless stated to the contrary, for the purposes of the present disclosure, the following terms shall have the following definitions:

Credit Card—a credit instrument issued by a real or virtual world institution to a player that allows the player to make purchases by providing an account identifier (e.g. a credit card number) rather than cash or other currency. An example is a credit card like those issued by Visa, MasterCard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, lines of credit and the like.

Virtual credit card—a financial instrument issued in a virtual environment that acts in the virtual environment for virtual currency the way a real world credit card acts in the real world for real currency.

Real Cash Value—the value in real dollars (or foreign currency if applicable) of the virtual currency. This value can be determined by multiplying the value of a virtual currency amount by the current exchange rate to real dollars (or other currency).

Total virtual obligation amount—the total amount of the virtual financial obligation(s) associated with a player character's account.

Virtual Contract—An enforceable agreement between a first player character and either another player character, a game server, credit card provider, or a third party. Some examples of virtual contracts are provided in U.S. Provisional Patent Application Ser. No. 60/652,036, which is hereby incorporated by reference in its entirety for all purposes.

Virtual—shall mean in a video game environment or other intangible space.

Virtual World—a world created in an online game such as World of Warcraft, or a virtual community such as Second Life, Eve or There.com.

Virtual Resource—a resource that can be used in the virtual world to create game attributes. Examples of virtual resources include wood, stone, herbs, water, ores, animals, monsters, bosses, NPCs, building materials, potions, etc.

Virtual Creditor—shall mean a first player character or other entity who is owed a virtual obligation by a second player character.

Virtual Credit Score—a score given to player characters in a video game based on one or more of the following criteria: the virtual assets they possess, the age of the character account, the type of account, e.g. basic or premium, the available credit line of the credit card associated with the account, the existing virtual financial obligations of the player character account, the player character's payment history including days to pay, amounts overdue or delinquent, and/or the player character's real world credit score, and/or the factors used in the real world to determine a credit score.

Virtual Financial Account—a virtual account issued to a player character by a virtual bank, game server or third party where virtual cash can be deposited and withdrawn.

Virtual Financial Obligation—An agreement by a player character or entity to pay one or more game attributes or virtual or real currency to another player character, entity or the game server. This obligation can be a one time payment, or may require multiple payments over time. The obligation may specify when payments and/or interest are due.

Virtual Financial Intermediary—Financial intermediaries are institutions including depository institutions, contractual savings institutions, and investment intermediaries or other entities, players or third parties which offer financial products and services for use within the virtual environment. The various financial intermediaries available in the virtual environment may each serve different or overlapping purposes and provide means for using, saving, borrowing, exchanging and transferring currency (real or virtual).

Virtual Financial Obligation Value—the in game value of the obligation. For virtual cash the value may be stated as a virtual and/or real cash amount. For other game attributes, the value can be determined by generating a virtual cash market value for the item based on the current value in an online marketplace or exchange. The value of the obligation may be fixed or variable and may also be set as a condition of the player contract and/or by the game server or other entity.

Billing Information—shall mean any information pertaining to billing a player (or a player character) for playing a game, accessing a game, purchasing goods or services, or any other reasons. Billing information may include such real world information as a billing address, credit card account number, bank account number, pay pal account number or other payment facilitator, or the account number of any other financial entity providing a real world credit line or any other payment-related information.

Character or "player character"—a persona created and controlled by a player in a video game.

Avatar—the virtual representation of a player character.

Character Account—an account that tracks character attributes.

Character Attribute—any quality, trait, feature or characteristic a particular Character can have that is stored in the corresponding Character Account. Character Attributes may include, but are not be limited to: 1. A character score 2. A virtual object 3. The physical appearance of a character 4. An emblem or mark 5. A synthetic voice 6. Virtual currency 7. Virtual help points or credits 8. The ability to join groups of other players at a later time 9. A score for subsequent matching of later game parameters 10. A relationship with another character 11. A genetic profile or makeup 12. A skill or skill level 13. A ranking Character Life—a fixed or variable, finite or infinite period of virtual or real world time that a player character can exist in a game environment.

Character Skills—game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

Computer Generated (CGC) or Non-Player (NPC) Character—any character that is controlled by the game system and/or a computer program and/or rules established by the game system and/or a player and not by a player on a continuous basis.

Game performance parameter—any aspect of a Video Game by which a player character's performance can be measured. Game Parameters shall include, but not be limited to: 1. Completing all or part of a mission 2. Playing for a certain period of time 3. Winning a match against another player character or computer generated character 4. Reaching a certain level or score 5. using or obtaining an ability or technology 6. kill/death ratios 7. obtaining, creating or modifying an object 8. solving a puzzle 9. accuracy with weapons 10. effective use of the proper weapon 11. killing a certain character/creature 12. getting through or to a certain geographic area 13. decreasing or increasing Karma Points 14. getting, buying, exchanging or learning a new skill or player attribute 15. having a child 16. getting married 17. obtaining, buying, trading, producing or developing raw materials 18. producing goods or services 19. earning income 20. earning a higher rank in an army 21. winning an election among two or more player characters 22. achieving deity or other status 23. improving player character status or caste 24. assisting other player characters with any of the above 25. speed of accomplishing or changing the rate or trends of any or all of the above.

In-game Marketplace—shall mean a virtual environment where Characters can exchange items, attributes, or any other exchangeable game element.

Novice Player—shall mean a player that is identified as requiring the help of an expert to complete a Game Parameter.

Player—shall mean an individual who can register an account with a Video Game Central Server or within a peer-to-peer network and create Characters that can interact with other Characters in a Virtual Environment, and/or that can authorize a NPC to act on the player's behalf.

Player Account—shall mean an account on the Video Game Central Server or within a peer-to-peer network that contains a Player profile including personal, billing, and character account information.

Player Attribute—shall mean any attribute that can be applied to a player account. Player Attributes shall include, but not be limited to: 1. Real Currency. 2. Discount of monthly fees for playing game. 3. Monthly fee for playing a game. 4. Interest rates for use of or borrowing real or virtual cash amounts. 5. Global character attribute settings for all characters created by player across multiple games. 6. Rewards for encouraging another player to signup to play.

Player to Player Contract—a real and/or virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—a game played on a Video Game Consul that may or may not be networked to a Video Game Central Server or within a peer-to-peer network.

Video Game Consul—a device comprising a CPU, memory and optional permanent storage residing at a player location that can allow for the playing of video games. Examples include, home PCs, Microsoft Xbox, and Sony Playstation.

Video Game Central Server—a CPU, memory and permanent or temporary storage that is connected to multiple Video Game Consuls that allows for Massive Multi Player Online Video Games to be played.

"Game Environment"—a particular level or area within a virtual world. Each game environment may have its own rules, regulation, currency, government, managers, etc. Game environments may exist within other game environments.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will under-stand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, or a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

DESCRIPTION

Massive multi player online games (MMOGs) or massive multi-player role playing games (MMORPGs) are computer games which are capable of supporting hundreds, thousands, or millions of players simultaneously. Typically, this type of game is played in a giant persistent world where the game continues playing regardless of whether or not real players are logged in. Players commonly access these games through a network such as the Internet, and may or may not be required to purchase additional software or hardware in order to play the game. Such networks allow for people all over the world to participate and interact with each other in a virtual environment. The present disclosure provides systems and methods which contribute to the evolution and longevity of such a game.

The herein described aspects and drawings illustrate components contained within, or connected with other components that permit play in the virtual environment. It is to be understood that such depicted designs are merely exemplary and that many other designs may be implemented to achieve the same functionality. Any arrangement of components to achieve the same functionality is effectively associated such that the desired functionality is achieved. FIG. 1 provides an exemplary network which may be used to support a virtual environment.

Referring to FIG. 1, a network 10 according to one embodiment includes a central server 20 in communication with a plurality of video game playing units 18. Those of ordinary skill in the art will appreciate that any number of video game playing units may be in communication with the central server. Typically, the number of video game playing units changes at various times as players join games and as players stop playing games. Similarly, more than one server may operate to coordinate the activities of the video game playing units, as is well known in the art.

Central server 20 may comprise any computing device (e.g., one or more computers) capable of communicating with other computing devices. The server 20 typically comprises a processor which is in communication with a storage device, such as an appropriate combination of RAM, ROM, hard disk, and other well known storage media. Central server 20 may comprise one or more personal computers, web servers, dedicated game servers, video game consoles, any combination of the foregoing, or the like.

Each video game device 18 may comprise any device capable of communicating with central server 20, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs).

Some or all of video game 17 can be stored on central server 20. Alternatively, some or all of video game 17 may be stored on the individual video game devices 18. Typically, the video game devices are able to communicate with one another. Such communication may or may not be facilitated by central server 20. Accordingly, a player 19a accessing video game 17 via game device 18a may be able to play with a player 19b accessing video game 17 via game device 18b. As shown, it may be possible for multiple players (e.g. 19c, 19d) to access central server 20 via the same game device (e.g. 18c).

Regardless of whether video game 17 is stored on central server 20 or video game devices 18, server 20 is typically configured to facilitate play of the game between multiple game players.

Those having skill in the art will recognize that there is little distinction between hardware and software implementations. The use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

While virtual environments as previously described allow for interactions between players, the amount and depth of interaction may be limited by the parameters of the game. For example, most virtual worlds/environments lack sophisticated financial systems. They therefore limit the capital raising ability of virtual entities such as game environments as well as potential investment opportunities for characters. This limits the scope of interactions available and inhibits growth and development of both the virtual economy and the virtual environment, decreasing the depth and enjoyment of play available.

Various embodiments of the invention address this issue by providing a means for buying and selling game environments or interests in game environments. Trade in ownership of game environments allows game environments to generate capital for investment as well as a means for tracking wealth and/or points in a game. Such a system increases the development of the game, increasing the enjoyment of the players and the sophistication of play available.

Game environments are particular levels or areas within a virtual environment. There may be game environments within game environments, or each game environment may stand alone. They may be controlled by the game server, game owner, manufacturer, one or more players, one or more characters, corporations, third parties, or a combination thereof. Game environments may be acquired by any means deemed appropriate by the parameters of the game. In one embodiment, the game server screens characters to determine eligibility for creating game environments using some or all of the following method steps: 1. Retrieve a player resume. A player resume may include, for example, the play history of a player in one or more virtual worlds. 2. Determine if the resume qualifies the player to create a game environment based on qualification rules and conditions. 3. Flag resume as qualifying and output notice to player character that he is eligible to create and manage a game environment.

Eligibility to create a game environment may be based on any qualifications determined by the parameters of the game, the game server, the owners of the local game environment, or any combination thereof In one embodiment, eligibility may be acquired when a character reaches a certain skill or wealth level. In another embodiment, game environments may be purchased. In a further embodiment, game environments may be granted to players and/or characters who discover them. In yet another embodiment, game environments may be won. In a further embodiment, game environments may be randomly distributed. In still another embodiment, characters or players could apply to open game environments. In another embodiment, the number of game environments available could be based on the number of characters playing, the market value of all game environments, the projected growth of the game or the existing game environments, the number of players playing, or any other criteria as determined by the game.

Game environments may exist as empty space, or may come with a certain number of resources and/or constraints or rules. Such resources, constraints or rules may be predetermined wherein every game environment starts with the same amount of resources, or resources may be distributed according to any relevant criteria including, but not limited to, randomly; as determined by the game sever or other game parameters; as determined by the game owner; as determined by the game environment owner; according to an evaluation of the game environment owner character(s) or player(s) such as, the amount of wealth the player(s) and/or character(s) has accumulated, the amount of time the character(s) has been in existence or the player(s) behind the character(s) has played the game, assessments of the skill level of the character(s), any other criteria relevant for assigning resources, or a combination of the above. For example, a game environment owner could receive a certain allocation of resources to be distributed in the game environment for each month the character has been in existence. In another embodiment, each game environment is initially worth a total number of points which may be attributable to natural resources. The allocation of resources depends on how the points are assigned by the owner of the game environment. Resources can be made available up front or over time, in periodic intervals, when certain events occur in the game environment, or in any other manner.

Figure 2:
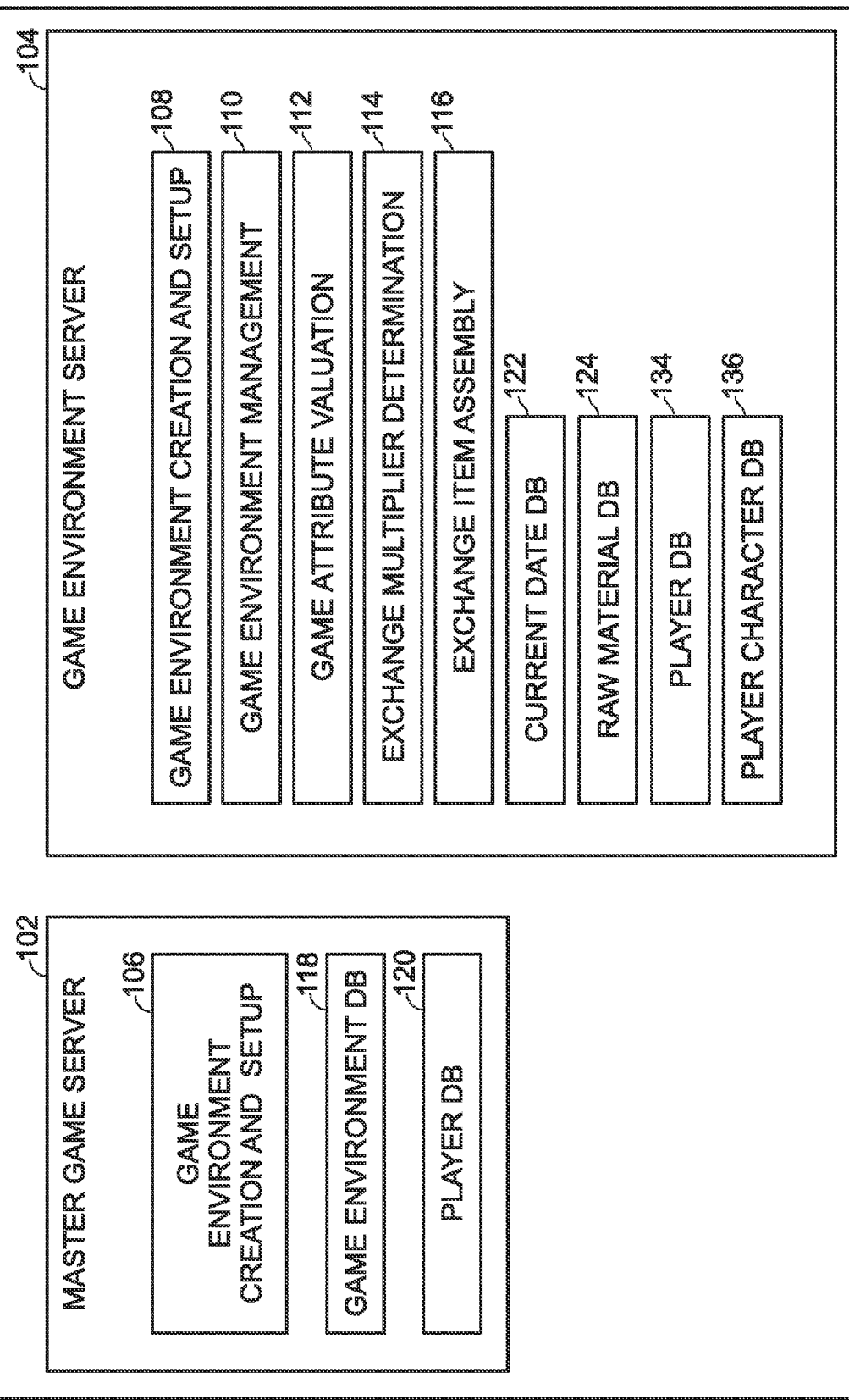
FIG. 2 is a block diagram depicting a system 100 according to one embodiment of the present invention.

Game environments may be created and run by any means applicable. In one embodiment, an exemplary system 100 is configured to provide the virtual environment described above. As shown in FIG. 2, system 100 includes a master game server 102 for running the game and a game environment server 104 for one or more game environments within the game.

Master game server 102 may host a program such as game environment creation and set up program 106. Master game server 102 may further host a plurality of databases including, for example, game environment database 118 and player database 120. Game environment server may host a plurality of programs including, for example, Game Environment Creation and Set Up Program 108, Game Environment Management Program 110, Game Attribute Valuation Program 112, Exchange Multiplier Determination Program 114, Game Item Assembly Program 116.

Game Environment server 104 may include a plurality of databases including, for example, current data database 122, raw material database 124, NPC database 126, skill database 128, era database 130, exchange multiplier database 132, player database 134, and player character database 136.

In one embodiment, game environment database 118 may store information regarding the game environment such as the game environment ID, identification of the owners, percentage ownership, configurations, creation date, fee structure, date of initial public offering (IPO) or any other information relating to the game environment. Player database 120 may include information regarding the players in a virtual environment, their ID(s), the character(s) they control, billing information and the game environments in which the players have characters.

In one embodiment, raw material database 124 may include, for example, the type of raw material available in a game environment, the location of the raw material, the first date available, conditions for use, conditions for discovery, conditions for availability, maximum quantity allowed, quantity issued, quantity remaining, license or permit fee, and times when available. Such conditions for raw material may be established when the game environment is formed, or may evolve or be reassigned as the game environment develops. Player database 134 may include information such as, but not limited to, player ID, the character(s) controlled by the player, billing information and personal information. Player character database 136 may include information such as, but not limited to, character ID, player ID, assets, skills, obligations, and game environment access.

Each game environment may have the same, similar or different attributes. Such attributes may be designated by the game server, allocated upon creation of the game environment, or selected by the owner. For example, the owner or other controlling entity may configure the game environment to meet certain parameters including, but not limited to, establishing the initial resources, available skills and maximum levels, game play types, taxes, permits, government types, exchange types, types of businesses and the maximum number of each business type, mission types and quantities along with allowed rewards, magic spells, licenses, etc. As the game develops, attributes may alter or disappear as they are used. The selection of attributes and the development of a game environment may serve to increase the wealth of the environment, attract other players to the environment, increase investment and building in an environment as well as contribute to the overall enjoyment of the game.

Among the aspects that may make a game environment more or less desirable may be the form of government that controls the game environment. The initial controlling entity of the game environment may establish a representative government, or may run the game environment as a republic, democracy, fiefdom, oligarchy, monarchy, dictatorship, theocracy, corporation or autocracy. The government may regulate as many or as few aspects of the game environment as it desires. For example, it may build infrastructure, maintain order, regulate trade, regulate commerce, regulate social welfare, control immigration, or any other type of activity commonly regulated by governments. In another embodiment, the government may merely collect taxes. In a further embodiment, the game environment may be a business and the governing entity may be a management team or a board of directors.

One area that may be controlled by the governing entity of a game environment is access to the game environment. In one embodiment, game environments are open to anyone. In another embodiment, access may be limited. For example, game environments may require petitions to enter, may have limitations on the number of characters or the types of characters that may be in the game environment at any one time, may encourage the entrance of particular types of characters, characters with particular skill sets, characters with particular credit scores, players with particular credit scores, characters with a particular asset base, any other type of criteria determined by the controlling entity of the game environment, the game server, game owner, or a combination thereof. In one embodiment, a character may be required to own shares or options in a game environment prior to playing in the environment. In another embodiment, characters may have to pay a fee or have a premium account in order to enter particular game environments. Such fees may be daily, monthly, annual or any fraction thereof. In one embodiment, such fees are paid to the owner(s) of the game environment. In another embodiment, such fees may be paid to the central server maintaining the game environment. In a further embodiment, such fees are shared between the central server and the owner(s). In another embodiment, such fees are paid to a central account for the game environment.

In one embodiment, an owner may recruit other characters or entities to play in the game environment. Such play can include development of the game environment including development of smaller game environments such as the construction of buildings, townships, estates, cities, municipalities, states, neighborhoods, or any other units. Characters could also form businesses, families, unions, co-ops, guilds, etc. or any other type of organization which assists in self-preservation, advancement, skill acquisition and accumulation of wealth, thereby contributing to the evolution of the game.

In one embodiment, an owner or governing entity could try to recruit the best group of players to play in their game environments so that they can build the wealth within that environment more quickly. Incentives could be offered as a recruitment tool. For example, stock or stock options in the game environment could be offered to players willing to play in the game environment. Such offers could occur using some or all of the following steps: 1. Receive a request to recruit player characters into a game environment, including resume criteria and stock or stock option offers based on resume criteria. 2. Generate a list of players that fall within resume criteria settings. 3. Output stock or stock option contract offers to players based on resume criteria. 4. Receive acceptance of offer(s). 5. Create new player accounts in game environment and assign stock or stock option contracts. In another embodiment, a player may petition to create and develop a character in a game environment. In a further embodiment, characters may post resumes including character history, skills, and assets and may receive offers from owners or controlling entities of game environments to play in that game environment.

The owners or government of a game environment may seek virtual funds for development and growth of the game environment. Such virtual funds may be obtained through a variety of means including, but not limited to, taxes, fees, licenses, bond issuance, loans, investors, commercial paper, convertible debt, bills, notes, debt issuance, venture capital, the issuance of private shares, transforming the game environment into a public company through an initial public offering, or through a follow on offering such as the issuance of common stock, preferred stock, or treasury stock.

Figure 3:
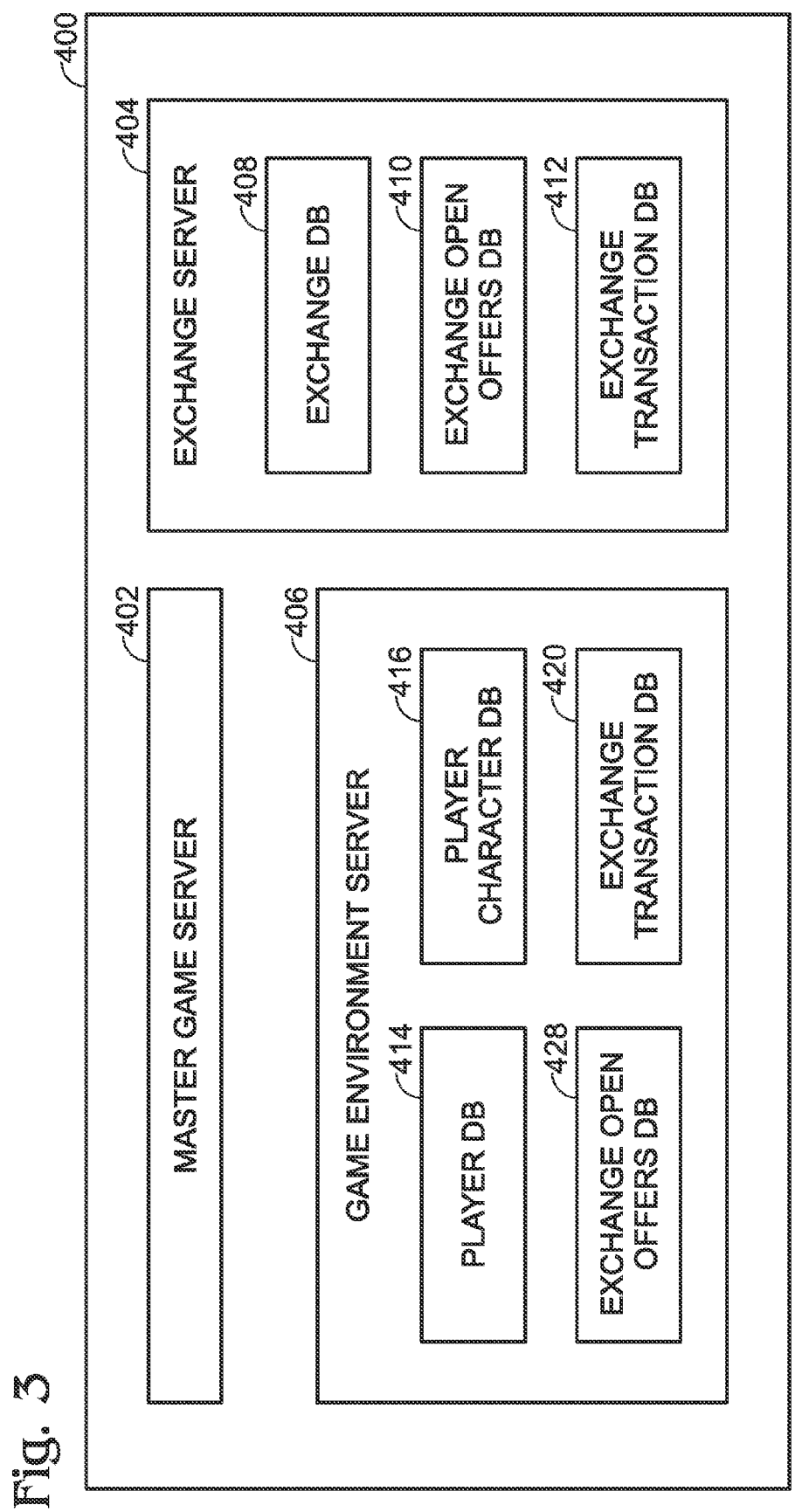
FIG. 3 is a block diagram depicting a system 400 according to one embodiment of the present invention.

For example, public or private shares in a game environment may be sold by the game environment to raise capital. The sale of shares may be accomplished by any means applicable. In one embodiment, shares are sold using a system such as the exemplary system 400 shown in FIG. 3. As shown, system 400 includes a master game server 402 a game environment server 406 and an exchange server 404.

Game environment server 406 may include databases such as player database 414, player character database 416, exchange open offers database 428, exchange transaction database 420.

In one embodiment, Player Database 414 may include information such as, but not limited to Player ID, Player Billing Info, Player Personal Info, Player Credit Info, Player Exchange Seat ID, and Player Assets. Player Character Database 416 may include information such as, but not limited to, Character ID, Player ID, Character Assets, Character inventory, Character Skills, Exchange Seat Owner Account Number, Exchange Seat Number, virtual account numbers.

Exchange Server 404 may include or host various programs, routines, subroutines and/or databases including, but not limited to an exchange database 408, an exchange open offers database 410, and an exchange transaction database 412.

In one embodiment, Exchange database 408 may include information such as, but not limited to, exchange ID, exchange type, allowable assets, and allowed traders. In another embodiment, exchange database 408 may include information regarding seats on the exchange such as the exchange seat price, maximum exchange seats allowed, exchange seats issued, and exchange seat qualifying conditions. Exchange open offers database 410 could contain information such as: 1. Offer ID 2. Offer type 3. Offer posting date 4. Offer expiration date 5. Offer Item 6. Offer Quantity 7. Offer Price.

Exchange open offers may additionally be associated with the character or player submitting the offer. Such information could be stored in Exchange Open Offer Database 428 and include information such as the character ID, holdings, offer ID, offer type, offer posting date, offer expiration date, offer item, offer quantity, and offer price.

In one embodiment, each transaction could be stored in an Exchange Transaction Database, for example in Exchange Transaction Database 412. Such a database could store information such as: 1. Order ID 2. Order Buyer 3. Order Seller 4. Order Date 5. Order Price 6. Order Type 7. Order terms and conditions In another embodiment, such transactions could be associated with the character in Exchange Transaction Database 420. Such a database could include information such as character ID, character inventory, order ID, order date, order, price, order type, and/or authentication number.

Various methods and systems for inter and intra game exchanges are described, for example, in co-pending U.S. patent application Ser. No. 11/560,456, entitled "Inter and Intra Game Exchanges in and Between MMOPVGs" filed Nov. 16, 2006, which is hereby incorporated by reference.

Initial shares may come from any number of sources. In one embodiment, each game environment is formed with an allocation of shares. In another embodiment, the owner(s) of a game environment may decide to issue public or private shares. The distribution of private shares may be made according to decisions of the owner(s) and the laws, rules and regulations of the game. For example, shares of the game environment may be distributed to characters playing in the game environment, for example to all characters who play in the game environment, to business owners in the game environment, to characters who have played in the game environment for a certain length of time, held by the owner(s), distributed in a lottery, distributed by whim, or according to any other criteria as determined by the game, game server, game owner, game environment owner, or any combination thereof.

In one embodiment, private shares may be sold to raise capital for the game environment. Investors may be sought by any means applicable. For example, the game environment may send out mass mailings through electronic mail, screen alerts, instant messaging of any other means used to communicate. In another embodiment, owner(s) may be prohibited from sending out general solicitations for private shares and must contact each investor individually. In a further embodiment, a database may exist which pairs game environments with potential investors.

Private shares may have restrictions on resale. For example, the sale or purchase of the shares may be limited to exchanges or characters within a particular game environment or to particular characters or organizations. Such limitations may be approved or overridden by the other shareholders. In another embodiment, such shares may be bought and sold between game environments and/or virtual environments. In one embodiment, the private shares may trade for an equal number of public shares when a game environment becomes public. In another embodiment private shares may be converted to some fraction of public shares. In yet another embodiment, ownership of private shares may give priority to the purchase of public shares.

Private game environments may become public, game environments may be public upon formation or public game environments may become private. For example, in one embodiment, game environments may become public by having initial public offerings. In another embodiment, each game environment may be formed with an allocation of shares held by the owner(s) which can be publicly traded on an exchange from the time of formation. In a further embodiment, a game environment can buy back shares.

Game environments may automatically go public. For example they may be public upon formation, converted to public companies when they reach a certain size, population density, wealth, age, asset value, number of businesses, when a stock market or exchange is discovered or formed, when a particular type of technology is discovered, or any other criteria established by the game, game owner, game server, game environment owner(s) or a combination thereof.

Figure 4:
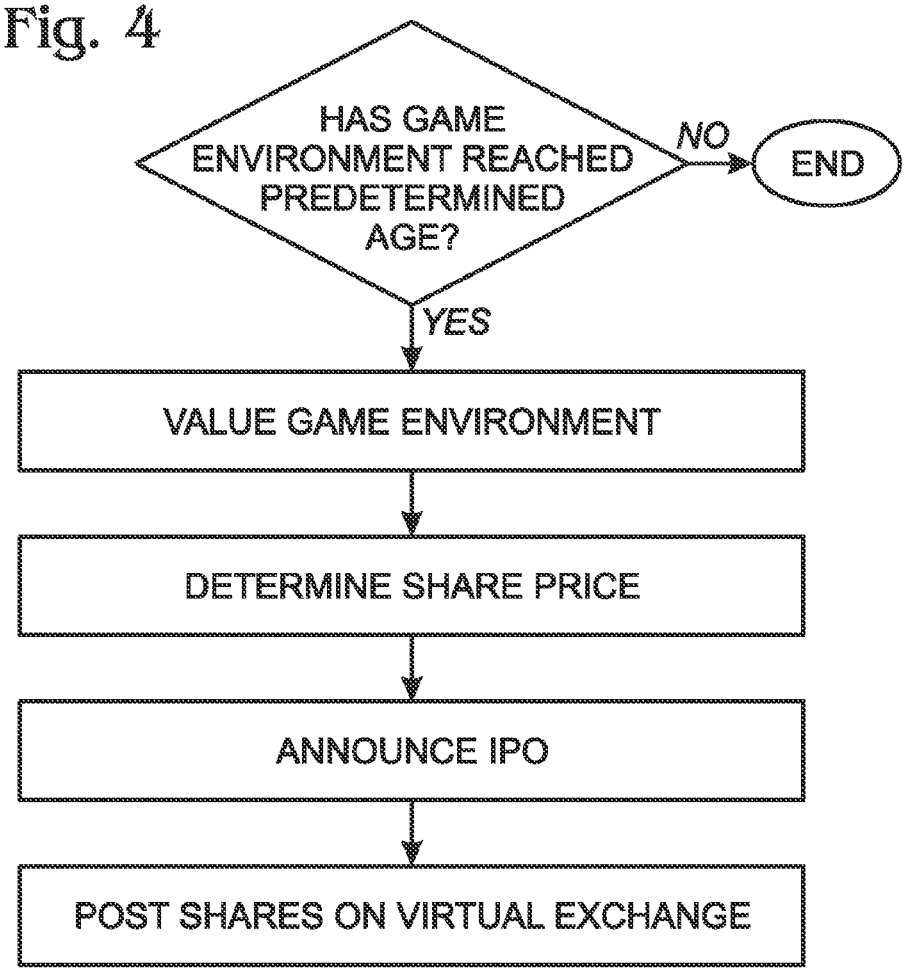
FIG. 4 is an embodiment of a method of launching an IPO according to one embodiment of the invention.

In one embodiment, once a game environment reaches a particular age, a routine such as that outlined in FIG. 4 may be launched where the game server determines that the game environment has reached the required age. The game server then values the game environment, or requests a valuation, publishes notice of the initial public offering and lists the shares on a primary or secondary exchange.

In another embodiment, the game owner(s) or governing entity may decide to launch a public offering and sell shares in the game environment. In order to launch a public offering, the owner(s) may be required to register the game environment with a governing entity. In one embodiment, each game environment is registered upon formation. In another embodiment, some type of notification or filing must be made with a governing entity. Such notification may be made by electronic mail, regular mail, screen alert, instant messaging, or any other type of communication which would effectively comply with the notification requirements. Notification may include any information requested or required by the governing entity, game owner, game server or any combination thereof. Such notification may be available to everyone, or may be a confidential document. It may include or require information such as the design of the game environment, the types of businesses in the game environment, the structure of the game environment, the types of characters in a game environment, information regarding management or government of the game environment, information regarding earnings of the game environment, valuation of the game environment, an explanation of how the proceeds are to be used, a list of the owners, financial statements, and/or risk disclosures, etc. In yet another embodiment, there is no notification process required before the selling of shares in a game environment.

The value of game environments may be assessed by measuring any of a number of parameters including, but not limited to, the growth of the economy, the value of its natural resources, the amount of investment that is being made, the number of characters working or inhabiting the game environment, the amount of development that is taking place, the amount of land available for development, the amount of trade, the stability of the economy, taxes, cash flow, the assets of the inhabitants, the standard of living of the characters, the imports and exports into the economy, any other factor that is generally used to value an economy or any combination of the above.

in one embodiment, the value of a game environment is calculated according to the following equation: consumption+investment+government spending+(exports−imports). In another embodiment, the value of a game environment is determined by the final value of the goods and services produced by the resident characters in a given time frame. In a further embodiment, the value is determined by the market value of the goods and services produced by the resident characters minus the depreciation in a given time period. In yet another embodiment, the value may be calculated by: consumption+investment+government spending+(exports−imports)+net foreign factor income−indirect taxes−depreciation. In yet another embodiment, the value of the assets in a game environment may be assessed. Assets may be valued according to their market value, on a multiple of the underlying natural resource that can be salvaged from the asset, by a professional estimator whether real or virtual, by an investment bank or any other applicable valuation method or combination thereof. In a further embodiment, valuation may be determined by tax revenue or fees generated by the game environment. In another embodiment, cash flow from transactions in the game environment could be calculated. Such valuation numbers may be used to determine an opening share price for stock in a game environment or on a price for options. In one embodiment, earnings in the environment over a set period of time could be multiplied by a factor to arrive at a valuation. For example, the virtual value of the assets of a given game environment could be $2,000,000. A stock multiplier of 2 may be applied to the value to determine that the game environment is worth $4,000,000. If 1,000,000 units of stock were initially issued to the player who owns the game environment, the stock is now worth $4.00 per share.

Valuations may also rely on conversion rates, factors or tables which may convert all assets to a common unit. Conversion rates may be determined by any means applicable. They may be fixed, on an automated trading system, or as determined by an exchange on the open market or any combination thereof. For example, conversion rates may be based on a comparison of the economies of two game environments, a comparison of a representative basket of goods, the number of player characters in each environment, the amount of a particular virtual asset available in a particular game environment, the amount of production of a virtual asset in the game environments or on any other number of market forces or comparable factors. For example, a gallon of oil may be converted to two gallons of oil when traded from War Craft to Second Life. In another embodiment, a barrel of oil may be converted into 1000 thistle seeds within a game environment, and/or a barrel of oil may be converted to 5000 thistle seeds when exchanged between two games. 5000 thistle seeds may be worth 3 shares of stock in a particular game environment. In a further embodiment, a game attribute coming from a first environment may be converted into a game attribute in a second environment by multiplying the value of the game attribute in the first environment by a conversion multiplier that reflects the difference in the labor (and/or other factors) required to build the game attribute in the first environment vs. the second environment. For example, 1000 thistle seeds in one game environment may be worth 700 thistle seeds in another game environment. Alternatively or additionally, the multiplier may take into account any differences in supply, availability, ease or cost of acquisition, or the like, of the resources and/or the prevailing exchange rates of real or virtual currency. Some game environments may be configured to produce items more optimally. These game environments may receive a premium valuation in that their labor is more efficient in that game environment than on other game servers. Alternatively, environments that produce such items more optimally may be penalized or a tariff may be imposed to create a more fair exchange between or among such game environments.

In one embodiment, some or all of the following steps may be used to convert assets between game environments. 1. Generate a conversion value for two or more game environments based on activity and conditions in the game environments. 2. Create a conversion multiplier based on the relationship of the values between two or more game environments. 3. Store multiplier.

Once a valuation of a game environment has been made, an initial price for the value of the shares may be determined. The sale of shares may take place by any means applicable. In one embodiment, the game environment may decide to sell the shares itself, or may select a third party such as an underwriter to handle distribution of the shares. The underwriter or other third party may select the initial price for the game environment and assess demand based on current conditions. The underwriter may charge a fee for such transactions. Such a fee may be a flat fee, a percentage of the total amount to be sold, a percentage of the offering price, or any combination of the above. For example, the initial public offering may take place using a Dutch Auction, Firm Commitment, Best Efforts, Bought Deal or Self Distribution of Stock. In a Dutch Auction, the auctioneer begins with a high asking price which is lowered in increments until some participant is willing to accept the auctioneer's price, or a predetermined reserve price is reached. The winning participant pays the last announced price. In Firm Commitment, an underwriter assumes all inventory risk and purchases all securities directly from the issuer for sale to the public at the price specified. With Best Efforts, the underwriter agrees to use all efforts to sell as much of an issue as possible to the public. The underwriter can purchase only the amount required to fulfill its client's demand or the entire issue. However, if the underwriter is unable to sell all securities, it is not responsible for any unsold inventory. In one embodiment, the underwriter has a set time frame for selling the shares. If all of the shares are not sold within the agreed-upon time frame, the issuer must return any funds collected from investors. In a Bought Deal, an investment bank negotiates a price with the issuer and purchases securities from an issuer before selling them to the public. The investment bank (or underwriter) acts as principal rather than agent and thus actually "goes long" in the security. Once the shares are initially sold, they may be traded on an exchange or other secondary market. In a further embodiment, the game environment or the owners of the game environment may self distribute the stock in a direct public offering.

Shares may be sold directly to investors, or purchased on an exchange, such as a stock exchange, for virtual or real currency or for items of trade. Exemplary descriptions of exchanges may be found in U.S. patent application Ser. No. 11/560,456 filed Nov. 16, 2006, which is hereby incorporated by reference. Such exchanges may exist in the game environment selling the shares or may be located elsewhere in the virtual environment or in a different virtual environment than the virtual environment in which the game environment is located. In one embodiment, game environments may choose to offer stock on a real world stock exchange. Upon the issuance of actual stock in a real stock exchange, players could receive and/or have the option to receive real stock certificates/shares in proportion to and/or in exchange for their ownership of the virtual game environment as translated into real stock. Such a translation may be on a one-to-one basis, or based upon each player character's pro rated share of real to virtual shares, or any other method of conversion as agreed upon by the player characters that own such characters and/or game shares and/or as otherwise agreed to by the player characters and/or game manufacturers or any other duly appointed and authorized body to determine such valuation, and/or based upon a majority and/or super majority vote by all affected game players and/or only by those holding virtual shares and then only in proportion to their pro-rata share amounts and/or based upon their preexisting or subsequently established voting rights, which may be determined based upon their number of shares or based on the value of their shares and/or their exercise price for their options and the like.

Shares on virtual exchanges may be purchased using real currency, virtual currency, virtual assets or real assets. In one embodiment, purchases may be made in any currency or asset. In another embodiment, the value of the currency or asset must be converted to a specified currency by an exchange rate or conversion rate.

The exchange rate for one type of virtual currency for another type of virtual currency, virtual currency for real currency, virtual assets for real assets, real assets for virtual assets, real assets for virtual currency, virtual assets for real currency or virtual assets for virtual currency may be fixed in that the rate does not change for the duration of the game or segment of the game. Alternatively, the exchange or conversion rate may be variable. Such a variable rate may be pegged to a floating real world exchange relationship, for example the U.S. dollar/Japanese yen spot exchange rate, a percentage thereof, a plus or minus adjustment thereof, some other economic indicator, or a combination thereof. The exchange rate may also vary depending on the country of origin of the player, or may be fixed to a particular real world currency, i.e., all exchange rates are quoted in dollars. In another embodiment, the exchange rate may be floating and determined by market forces such as the relative demand for virtual currency versus real world currency, or the relative demand of particular types of virtual currency. Said exchange rates may further be established or determined by any suitable method including, but not limited to, by a) the game manufacturer, b) the owner(s) of the server(s) upon which the game resides, c) one or more player characters, d) market forces, e) law or regulation of the game or within the real world, f) negotiation among the affected parties, or g) any combination of the above.

Shares may all be of the same class or there may be multiple classes of shares with different rights. For example, some shares could be common stock, other shares could be preferred stock, prior preferred stock, convertible preferred stock, phantom stock, restricted stock, or treasury stock. Common stock usually entitles the owner to vote at shareholders' meetings and to receive dividends. Preferred stock generally does not have voting rights, but has a higher claim on assets and earnings than the common shares. For example, owners of preferred stock receive dividends before common shareholders and have priority over common shareholders in the event that a company goes bankrupt and is liquidated. Voting rights may also differ based on the type of shares. For example, one class may have the right to elect only a small percentage of the managers or members of the board or may have no election rights. Another class may elect the majority of board members. A further class may have the right to elect the government of the game environment.

In one embodiment, residents of a game environment may be offered shares prior to an IPO and/or offered the opportunity to trade assets owned in the game environment for a particular class of shares using such steps as: 1. Output a virtual IPO cash price of a share of a game environment to a player character. 2. Receive a request to exchange an asset for shares from a player character in the game environment. 3. Determine the asset value. 4. Receive the asset into the game environment account. 5. Transfer stock whose virtual cash value is equal to the virtual cash value of the asset to the player character. In a further embodiment, all residents may be given an equal number of shares when residency is established. In another embodiment, residents of a game environment may be given shares in an amount representative of their relative assets in that game environment. For example, some or all of the following steps may be used: 1. Determine a total virtual asset value for a game environment based on virtual assets and valuation rules and conditions. 2. Generate a percentage ownership of the total virtual asset value for each player character based on their ownership of virtual assets in a game environment. 3. Convert virtual asset ownership into share ownership of the game environment for each player character. 4. Notify player character of share ownership.

There may be limitations in the purchase and sale of shares of a game environment. For example, if a character or player becomes the owner of more than a certain percentage of the stock, for example 10%, such an acquisition must be reported to a governing entity, or may be prohibited by the game, game server, or exchange. In another embodiment, there may be blackout periods during which members of a controlling entity of a game environment cannot sell shares.

Various embodiments include the following twenty embodiments:

1. A method comprising: providing a virtual world accessible to a plurality of player characters; providing a game environment in the virtual world; raising capital in the game environment by selling shares of the game environment to at least one of the player characters.

2. The method of embodiment 1 wherein the game environment is created by at least one of the player characters.

3. The method of embodiment 2 further comprising determining if a player character is eligible to create a game environment.

4. The method of embodiment 3 wherein the step of determining if a player character is eligible to create a game environment includes retrieving a player resume associated with the player character.

5. The method of embodiment 3 wherein the step of determining if a player character is eligible to create a game environment includes determining the skill level of the player character.

6. The method of embodiment 3 wherein the step of determining if the player character is eligible to create a game environment includes determining the wealth level of the player character.

7. The method of embodiment 1 wherein the game environment includes a plurality of resources.

8. The method of embodiment 7 wherein the game environment is owned by one or more player characters, the method further comprising: providing an allocation of resources to the game environment owner; and allowing the game environment owner to distribute the allocated resources.

9. The method of embodiment 8 wherein the game environment owner is the player character who created the game environment.

10. The method of embodiment 8 further comprising allocating resources upon completion of a game parameter.

11. The method of embodiment 10 wherein the game parameter is passage of a given amount of time.

12. The method of embodiment 10 wherein the game parameter is the occurrence of a given event in the virtual world.

13. The method of embodiment 1 further comprising determining if a given player character is eligible to access the game environment.

14. The method of embodiment 13 wherein determining if a given player character is eligible to access the game environment comprises determining if the given player character owns shares in the game environment.

15. The method of embodiment 13 wherein determining if a given player character is eligible to access the game environment comprises receiving a fee from the given player character.

16. The method of embodiment 1 further comprising recruiting player characters into the game environment by: determining a set of criteria usable to identify player characters to be recruited into the game environment; determining which player characters in the virtual world fulfill some or all of the criteria; and offering an incentive to player characters who fulfill some or all of the criteria.

17. The method of embodiment 16 wherein the incentive is stock in the game environment.

18. The method of embodiment 16 wherein the incentive is a stock option in the game environment.

19. The method of embodiment 1 further comprising providing an exchange accessible to the player characters through which player characters may buy and sell stock in the virtual environment.

20. The method of embodiment 19 further comprising: determining that the game environment fulfills a given criteria; determining a value for the game environment; publishing a notice of initial public offering; and offering shares in the game environment on the exchange.

Stock options in a game environment may also be distributed. Such options may be given to all members of a game environment, key personnel in a game environment, potential players, leaders in a game environment, as a recruitment tool to encourage people to play in a game environment, may be distributed at random, or according to any criteria determined by the governing body or owners of the game environment, or any combination of the above. Such options may be based on the appraised market value of the shares or on any share strike price desired. Options may be exercisable at any time, or may not be exercisable until a public offering has been made or until a certain amount of time has passed after the initial public offering. Expiration of the options may be set at any time. In one embodiment, options must be exercised within five years. In another embodiment, options must be exercised within ten years. In one embodiment, some or all of the following steps may be used to exercise an option: 1. Receive a request to exercise a virtual stock option of a game environment. 2. Determine if request is possible based on exercise conditions. 3. If request is possible, determine a virtual cash amount due based on exercise price of option. 4. Output amount due. 5. Receive payment of amount due. 6. Release stock of game environment to player character. 7. Flag option as exercised.

Types of transactions may be limited by the level of participation of the player or player character. Such limitations could depend upon the skill, experience, and sophistication of the authorized user and/or the player's real or virtual credit score and/or real or virtual current or predicted income levels Types of transactions may be limited by the level of participation of the player or player character. Such limitations could depend upon the skill, experience, and sophistication of the authorized user and/or the player's real or virtual credit score and/or real or virtual current or predicted income levels. For example, players may advance through different levels of play and after achieving certain benchmark standards or having an account established for a particular length of time, they may be granted wider access to financial intermediaries and the services provided by such intermediaries.

It will be appreciated that while, for the sake of discussion, these databases have been described separately, the data in these and any other suitable databases could be merged into a single large databases and/or maintained separately in additional databases, or in other structures besides a database. Moreover, any such databases could be independent or linked, and the data in these databases could be stored centrally on a server or separately on game devices.

The present disclosure provides numerous systems and methods related to virtual environments in online computer games. It should be appreciated that numerous embodiments are described in detail and that various combinations and subcombinations of these embodiments are contemplated by the present disclosure.

CONCLUSION

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps. Furthermore, it will be understood that while various embodiments are described, such embodiments should not be interpreted as being exclusive of the inclusion of other embodiments or parts of other embodiments.

The invention is described with reference to several embodiments. However, the invention is not limited to the embodiments disclosed, and those of ordinary skill in the art will recognize that the invention is readily applicable to many other diverse embodiments and applications as are reflected in the range of real world financial institutions, instruments and activities. Accordingly, the subject matter of the present disclosure includes all novel and nonobvious combinations and subcombinations of the various systems, methods configurations, embodiments, features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. 1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features is required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. 112, paragraph 6, applies to that limitation.

In a claim, a limitation of the claim which does not include the phrase "means for" or the phrase "step for" means that 35 U.S.C. 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. 112, paragraph 6, applies to that step(s).

With respect to a means or a step for performing a specified function in accordance with 35 U.S.C. 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

The invention claimed is:

1. A method performed by a computer, the method comprising:
running, by a Video Game Central Server, a massive multi player online game that is operable to support a plurality of players via a plurality of video game devices,
in which each of the players controls at least one player character, providing, by the Video Game Central Server, a game environment in the online game,
in which the game environment is owned by a first player character;
requiring, by the Video Game Central Server, each of a subset of the player characters to pay a fee to the first player character in order to access the game environment;
determining a valuation of the game environment based on the fees generated by the game environment;
determining an opening share price for the game environment based on the valuation;
selling shares of the game environment for the opening share price;
distributing shares of the game environment to each of the subset of player characters that play in the game environment;
offering stock in the game environment on an exchange; and
providing, to each of the subset of player characters, shares of stock in proportion to the respective shares of the game environment held by the player character.

2. The method of claim 1 wherein the game environment is created by at least one of the player characters.

3. The method of claim 2 further comprising
determining if a second player character is eligible to create a game environment.

4. The method of claim 3 wherein the step of determining if a second player character is eligible to create a game environment includes retrieving a player resume associated with the second player character.

5. The method of claim 3 wherein the step of determining if a second player character is eligible to create a game environment includes determining the skill level of the second player character.

6. The method of claim 3 wherein the step of determining if the second player character is eligible to create a game environment includes determining the wealth level of the second player character.

7. The method of claim 1 wherein the game environment includes a plurality of resources.

8. The method of claim 7 wherein the method further comprises:
providing an allocation of resources to the first player character; and
allowing the first player character to distribute the allocated resources.

9. The method of claim 8 wherein the first player character is the player character who created the game environment.

10. The method of claim 8 further comprising
allocating resources upon completion of a game parameter.

11. The method of claim 10 wherein the game parameter is passage of a given amount of time.

12. The method of claim 10 wherein the game parameter is the occurrence of a given event in the game environment.

13. The method of claim 1 further comprising
determining if a second player character is eligible to access the game environment.

14. The method of claim 13 wherein determining if a second player character is eligible to access the game environment comprises determining if the second player character owns any of the shares in the game environment.

15. The method of claim 1 further comprising
recruiting player characters into the game environment by:
determining a set of criteria usable to identify player characters to be recruited into the game environment;
determining which player characters fulfill some or all of the criteria; and
offering an incentive to player characters who fulfill some or all of the criteria.

16. The method of claim 15 wherein the incentive is stock in the game environment.

17. The method of claim 15 wherein the incentive is a stock option in the game environment.

18. The method of claim 1 further comprising
providing an exchange accessible to the player characters through which player characters may buy and sell the shares.

19. The method of claim 18 further comprising:
determining that the game environment fulfills a given criteria;
publishing a notice of initial public offering; and
offering shares in the game environment on the exchange.

* * * * *